(12) United States Patent
Hyakutake (10) Patent No.: US 8,147,379 B2
(45) Date of Patent: Apr. 3, 2012

(54) SHIFT CONTROL DEVICE OF AUTOMATIC TRANSMISSION

(75) Inventor: Itsuo Hyakutake, Hiroshima (JP)

(73) Assignee: Mazda Motor Corporation (JP)

( * ) Notice: Subject to any disclaimer, the term of this patent is extended or adjusted under 35 U.S.C. 154(b) by 339 days.

(21) Appl. No.: 12/606,816

(22) Filed: Oct. 27, 2009

(65) Prior Publication Data

US 2010/0179025 A1 Jul. 15, 2010

(30) Foreign Application Priority Data

Jan. 9, 2009 (JP) ................................. 2009-003531

(51) Int. Cl.
*F16H 61/16* (2006.01)

(52) U.S. Cl. ....................................................... 477/125
(58) Field of Classification Search ........................ None
See application file for complete search history.

(56) References Cited

U.S. PATENT DOCUMENTS 7,029,421 B2 * 4/2006 Henneken et al. ............ 477/120
7,637,846 B2 * 12/2009 Tamai et al. .................. 477/110

FOREIGN PATENT DOCUMENTS

JP 2001-336630 A 12/2001
JP 2007-315414 A 12/2007

* cited by examiner

*Primary Examiner* — Dirk Wright
(74) *Attorney, Agent, or Firm* — Studebaker & Brackett PC; Donald R. Studebaker (57) ABSTRACT

A control device, in which a shift-up control is automatically executed when an engine's over revolution with a turbine speed for a shift gear set by a manual shift mode exceeding a preset limit speed A is executed, is configured such that a controller detects an engine's over revolution (Yes in step s2), and cancels the shift-up control (step s8) when detecting a closing change of an accelerator opening by a specified angle (Yes in step s5) during a period of time from an output timing of a shift-up command (step s4) to specified timing of an inertia phase start I (Yes in step s6).

12 Claims, 7 Drawing Sheets

FIG. 7A Limit-Speed for Shift Gears Managing Table 41

| Gear | Limit-Speed for Shift Gears |
|---|---|
| 1 | O,OOO |
| 2 | O,OOO |
| 3 | O,OOO |
| 4 | O,OOO |
| 5 | O,OOO |
| 6 | O,OOO |
| 7 | O,OOO |

FIG. 7B Correction-Speed for Oil Temperature Managing Table 42

| Temp. | Correction-Speed for Oil Temp. |
|---|---|
| −5 | ××× |
| −10 | ××× |
| −15 | ××× |
| −20 | ××× |
| ...... | ...... |

FIG. 7C Correction-Speed for Upward-Slope Inclination Managing Table 43

| Upward Incl. | Correction-Speed for Upward Slope Inclination |
|---|---|
| 1% | △△△ |
| 2% | △△△ |
| 3% | △△△ |
| 4% | △△△ |
| ...... | ...... |

FIG. 7D Correction-Speed for Downward-Slope Inclination Managing Table 44

| Downward Incl. | Correction-Speed for Downward Slope Inclination |
|---|---|
| −1% | ▽▽▽ |
| −2% | ▽▽▽ |
| −3% | ▽▽▽ |
| −4% | ▽▽▽ |
| ...... | ...... |

SHIFT CONTROL DEVICE OF AUTOMATIC TRANSMISSION

BACKGROUND OF THE INVENTION

The present invention relates to a shift control device of an automatic transmission which is equipped with a manual shift mode, which may be installed in automotive vehicles.

Conventionally, the automatic transmission for automotive vehicles which is equipped with the automatic shift mode, in which a shift gear is selected automatically depending on vehicle traveling states, and the manual shift mode, in which the shift gear is selected by a manual operation of a driver, has been used widely.

Figure 2A:
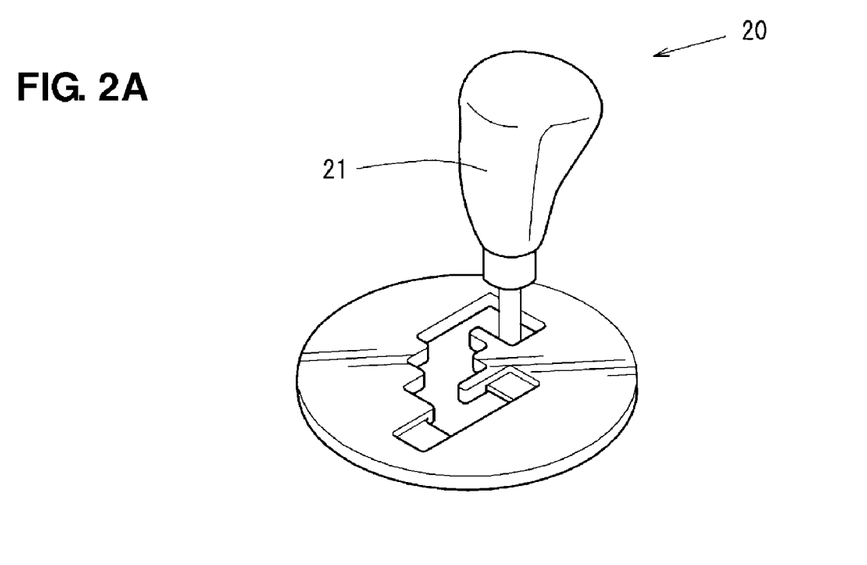
FIG. 2 is an explanatory diagram of a shift operational portion.

A shift operating portion 20 for a range selection of this kind of automatic transmission has M range of the manual shift mode, in addition to P range for parking, R range for reversing, N range for neutral, and D range for forwarding of the automatic shift mode (see FIG. 2A).

Figure 2B:
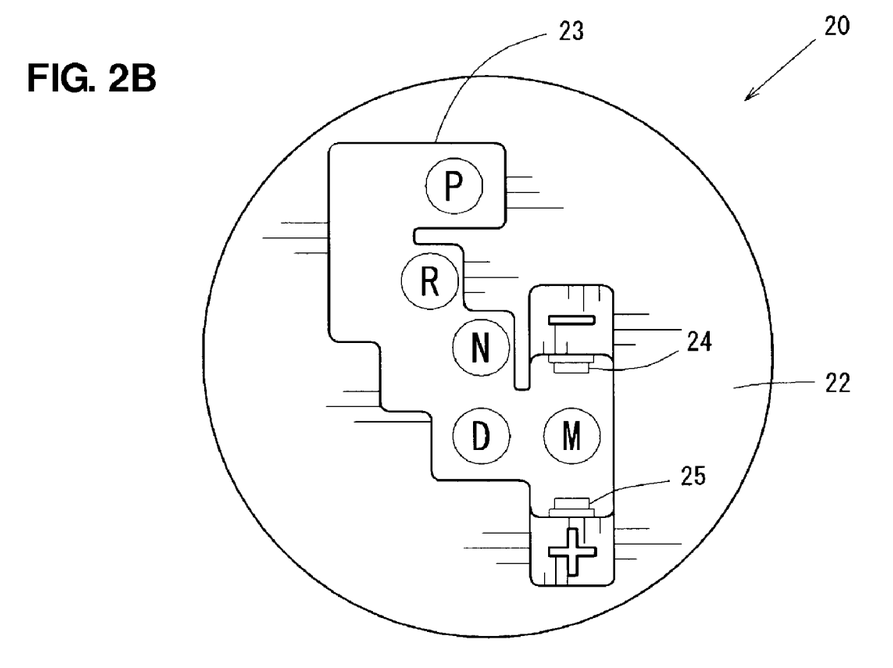

When the driver operates a shift lever 21 to D range, the forward traveling of the vehicle with the automatic shift mode can be provided. Meanwhile, when the shift lever 21 is shifted to M range by the driver, the manual mode is selected. In the manual mode, the shift-up operation of gear is achieved by pushing the shift lever 21 downward, i.e., toward the "+" side (FIG. 2B), while the shift-down operation of gear is achieved by pushing the shift lever 21 upward, i.e., toward the "−" side (FIG. 2B).

Figure 5:
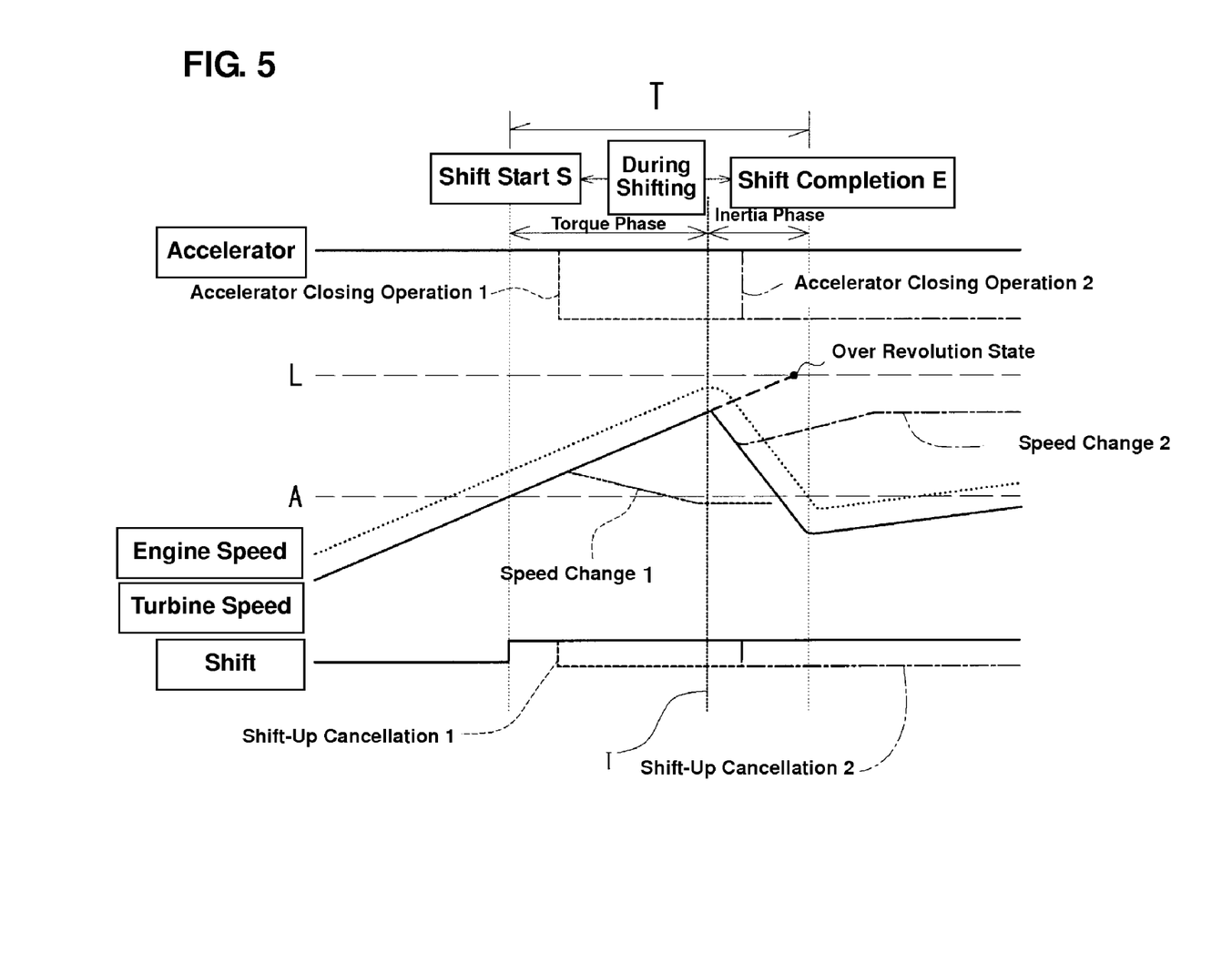
FIG. 5 is an explanatory diagram regarding an engine speed during the shift operation of the automatic shift-up control.

Herein, according to the above-described automatic transmission equipped with the manual mode, the shift control is configured to execute the shift-up control automatically even in case of the manual mode when a preset limit speed A of the engine is detected in order to prevent the over-revolution state of the engine which may increase over the engine's limit speed L and cause some damage to the engine (see FIG. 5).

However, there is a concern that this automatic shift-up control would give the driver unconformable driving feelings because of its unexpected shift to the driver, and would cause the unstable vehicle driving because the driving force could not be ensured as the driver had expected.

Moreover, there is a problem in that in case the above-described automatic shift-up control and the manual shift-up operation are conducted almost at the same time and they are overlapped, for example, a two-stage shift-up of gears would occur. Herein, Japanese Patent Laid-Open Publication No. 2007-315414 discloses the gear shift control device in which the manual shift-up operation is restricted when the automatic shift-up control is commanded to prevent the two-stage shift-up of gears, so that the unexpected shift-up can be prevented.

Herein, since in general some appropriate operational time T may be required during a period of time from a shift-up shift start S to a shift completion E for the above-described automatic transmission which can avoid the engine's over revolution, the above-described preset limit engine speed A is set to be lower than the above-described engine's limit speed L so that the engine speed does not exceed the engine's limit speed L even if the engine speed increases during the operational time T (see FIG. 5).

There was a problem in that, for example, even in case the driver operated the accelerator so as to be closed during the period of time from the detection of the preset limit speed A which is lower than the engine's limit speed L to the shift-up completion E in order to avoid the over revolution, if the shift-up of gear was executed by the automatic shift-up control, the reduction of driving force by this shift-up would occur in addition to the reduction of driving force by the driver's closing the accelerator and thereby an unexpected large reduction of driving force would occur, so that the driver could not obtain the driving force which the driver had expected

SUMMARY OF THE INVENTION

Accordingly, an object of the present invention is to provide a shift control device of an automatic transmission which is equipped with a manual shift mode, which can properly restrict the shift-up of gear caused by the automatic shift-up control which may be executed during the period of time from the detection of the specified engine speed to the completion of the shift-up in case of the driver's closing operation of the accelerator, thereby restraining the unexpected shift-up for the driver from occurring.

According to the present invention, there is provided a shift control device of an automatic transmission which is equipped with a manual shift mode, in which a gear shift is executed based on a signal of a manual operation, comprising a shift-up control means for executing a shift-up control, in which a gear selected by the manual shift mode is automatically shifted up to a higher-speed gear when an engine speed exceeds a specified engine speed, an accelerator-opening change detecting means for detecting a closing change of an accelerator opening by a specified angle during a period of time from an output timing of a shift-up command when the engine speed exceeds the specified engine speed to specified timing when a shift-process degree of the shift-up control by the shift-up control means reaches a specified process degree, and a shift-up control canceling means for canceling the shift-up control by the shift-up control means when the specified-angle closing change of the accelerator opening is detected by the accelerator-opening change detecting means. Herein, the above-described engine speed includes a relevant speed to the actual engine speed, such as a turbine speed of a torque converter, or a tire speed. The above-described shift-process degree of the shift-up control means a process degree in the operation of the gear selection to the higher-speed gear. In case the shift-up control has progressed to a certain degree, if the shift was cancelled, a shift shock would be caused by the gear returning, thereby making the driver have uncomfortable feeling. The above-described specified process degree is set so that the uncomfortable feeling which the driver may have can be properly small.

According to the present invention, while the operational time may be required from the shift-up command to the shift completion, in case the driver operates the accelerator so as to be closed by the shift-process degree of the shift-up control reaches the specified process degree in the operational time, the shift-up control can be cancelled. Thereby, an improperly large reduction of the drive force due to the accelerator closing operation and the shift-up control, which may be against the driver's expectation, can be prevented, thereby preventing any improper deterioration of the drivability.

According to an embodiment of the present invention, the above-described specified process degree of the shift-up control is set to specified timing at a start of an inertia phase of gear shifting. Herein, the above-described specified timing at the start of the inertia phase of gear shifting means a transitional timing from the torque phase to the inertia phase of gear shifting, where a reverse change in the direction of the increase or decrease of the engine speed or the above-described relevant speed is detected. Herein, the above-described specified timing at the start of the inertia phase may be set to timing when a specified period of time has passed from the shift-up command. According to the present embodiment, the shift-up control is cancelled if it is before the start of the inertia phase. Meanwhile, if it is after the start of the inertia phase, the sift-up control is continued. Specifically, cancellation and continuance of the shift-up control can be properly determined without causing any shift shock at the start timing of the inertia phase. Thereby, deterioration of the drivability can be prevented properly without causing any shift shock at the gear returning due to the cancellation of the shift-up control. Further, the over revolution of engine can be prevented properly by the continuance of the shift-up control.

According to another embodiment of the present invention, the shift control device of an automatic transmission further comprises a road-inclination detecting means for detecting an inclination degree of a road ahead of a traveling vehicle, and a setting means for setting the specified engine speed depending on the road inclination degree detected by the road-inclination detecting means. Herein, the road-inclination detecting means includes an accelerator sensor, a detecting means for detecting the road inclination degree based on the drive force and the vehicle speed, or a detecting means for obtaining the road inclination information from the map data of GPS navigation system. The above-described setting the specified engine speed depending on the road inclination degree by the road-inclination detecting means includes setting in such a manner that the greater the inclination degree of an upward slope is, the higher the specified engine speed is, or setting in such a manner that the greater the inclination degree of a downward slope is, the lower the specified engine speed is. According to the present embodiment, since the specified engine speed to detect the over revolution of the engine is set depending on the inclination degree of the road on which the vehicle travels, the engine's over revolution can be prevented more surely and the unnecessary shift-up control can be restrained.

According to another embodiment of the present invention, the shift control device of an automatic transmission further comprises an automatic-transmission oil-temperature detecting means for detecting an oil temperature of the automatic transmission, and a setting means for setting the specified engine speed depending on the oil temperature detected by the automatic-transmission oil-temperature detecting means in such a manner that the lower the oil temperature is, the lower the specified engine speed is. Herein, the oil temperature means the temperature of an automatic transmission fluid (hereinafter, referred to as "ATF") which is filled in the automatic transmission. According to the present embodiment, the engine's over revolution at the low temperature can be prevented surely. Specifically, when the temperature of ATF is low, the viscosity of ATF is so high that the operational time from the start of shift-up to the shift completion becomes longer compared to a case in which the ATF's temperature is high. Accordingly, by setting the specified engine speed depending on the oil temperature in such a manner that the lower the oil temperature is, the lower the specified engine speed is, even in case the operational time becomes longer, the engine's over revolution caused by the engine exceeding the engine limit speed L can be prevented surely.

Other features, aspects, and advantages of the present invention will become apparent from the following descriptions which refer to the accompanying drawings.

DETAILED DESCRIPTION OF THE INVENTION

Figure 1:
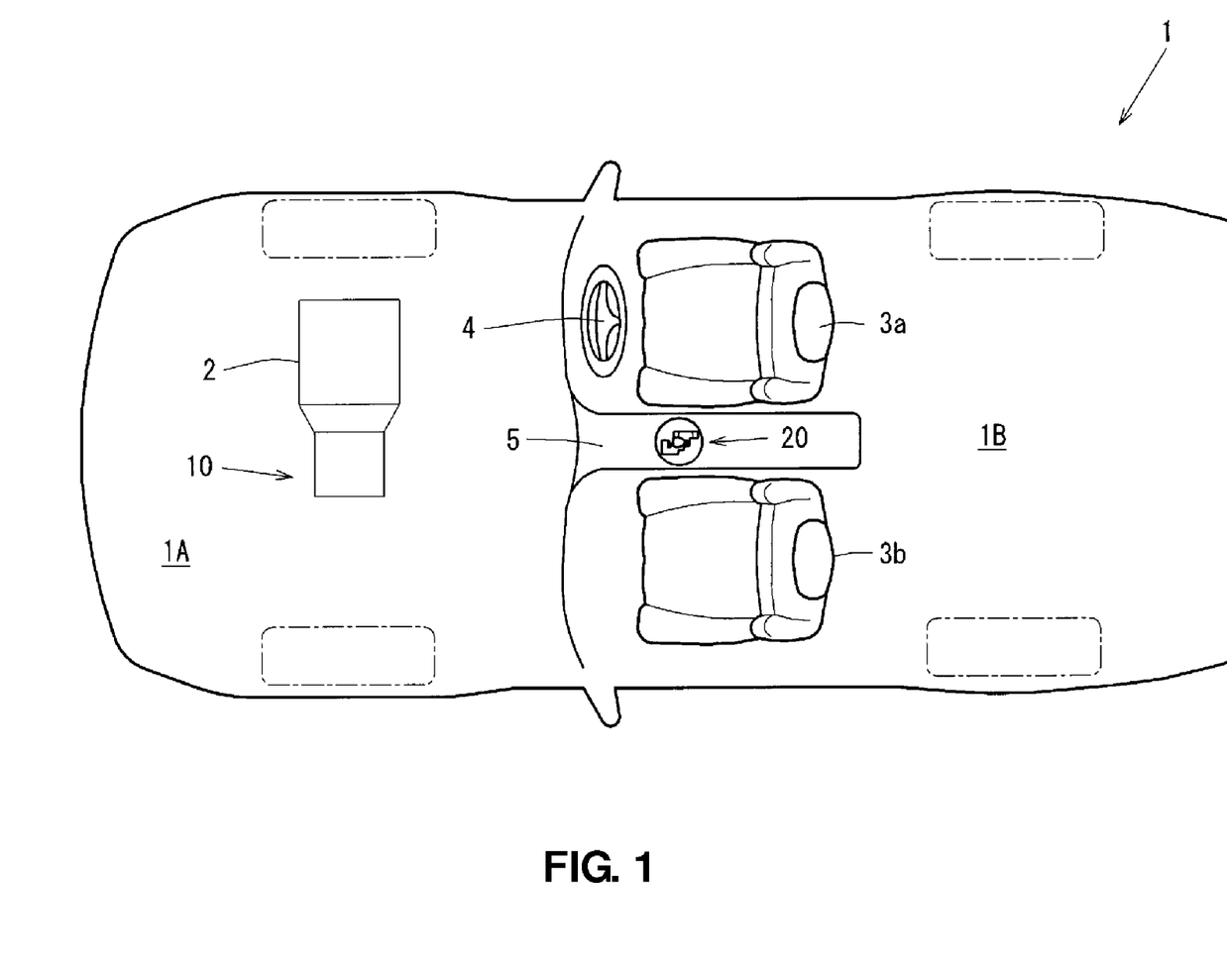
FIG. 1 is a schematic constitution diagram of a vehicle equipped with an automatic transmission according to an embodiment of the present invention.
Figure 3:
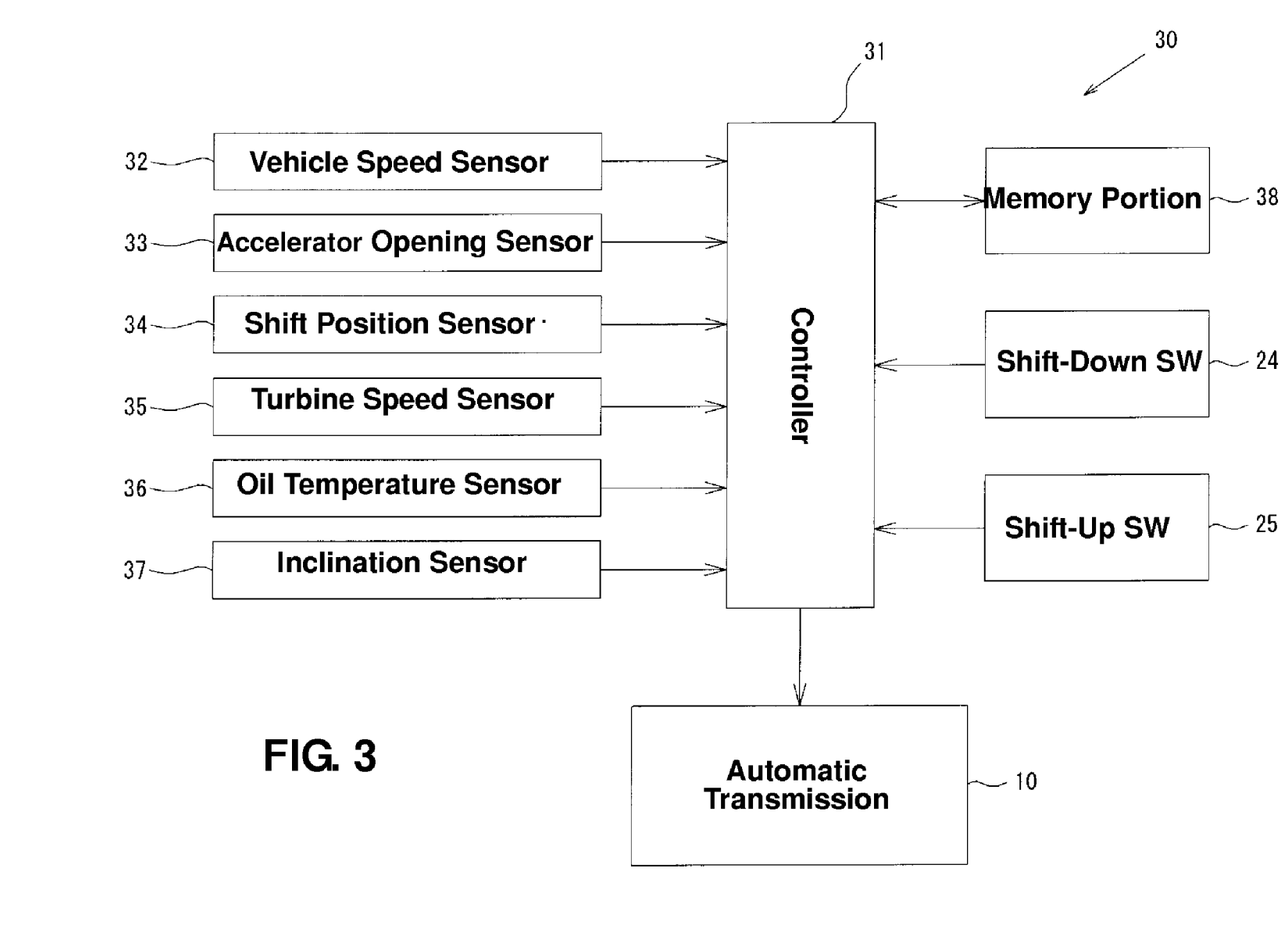
FIG. 3 is a block diagram of a control device to control the automatic transmission.
Figure 4:
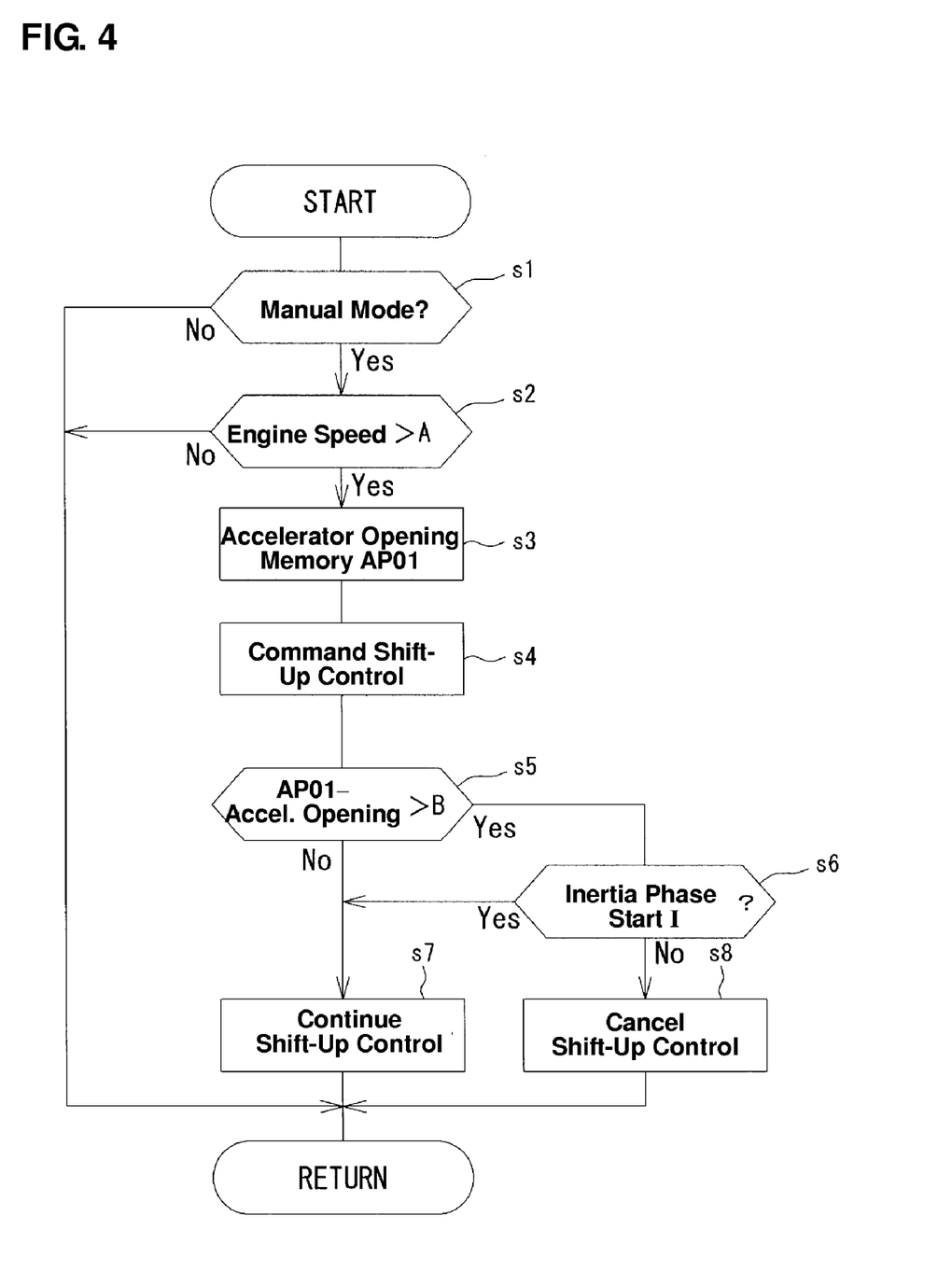
FIG. 4 is a flowchart of a shift operation of an automatic shift-up control.
Figure 6:
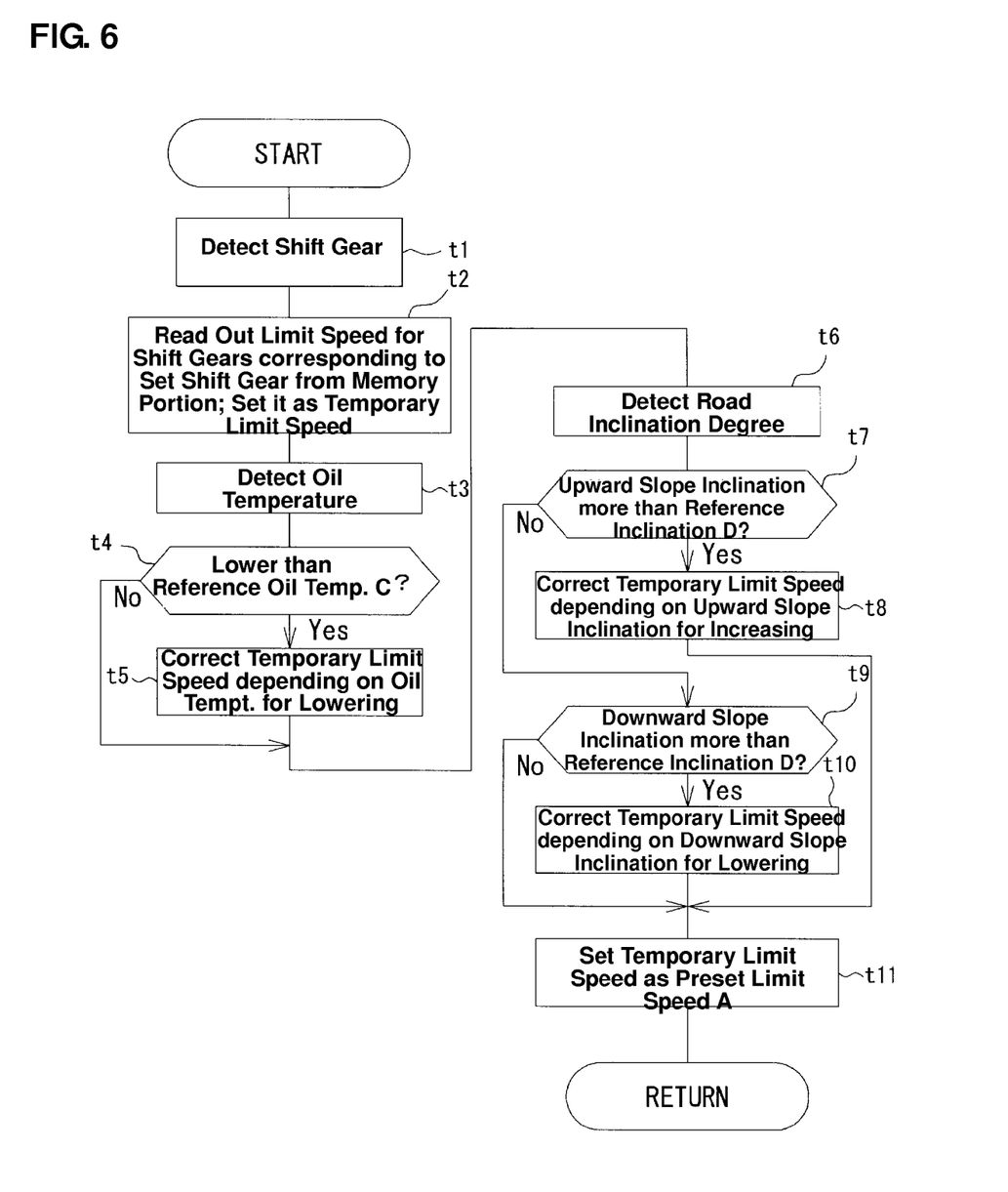
FIG. 6 is a flowchart to set a specified engine speed.
Figure 7A:
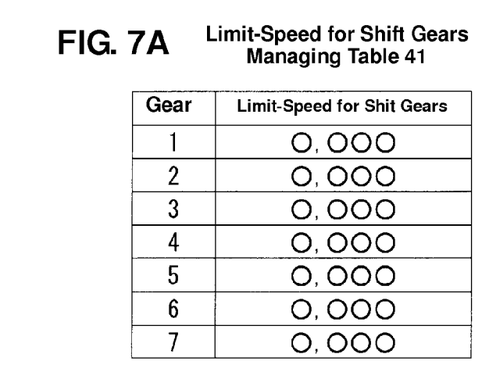
FIGS. 7A, 7B, 7C, 7D are explanatory diagrams regarding managing tables memorized at a memory portion.
Figure 7B:
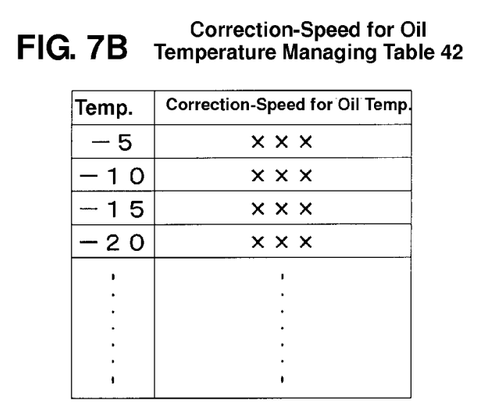
Figure 7C:
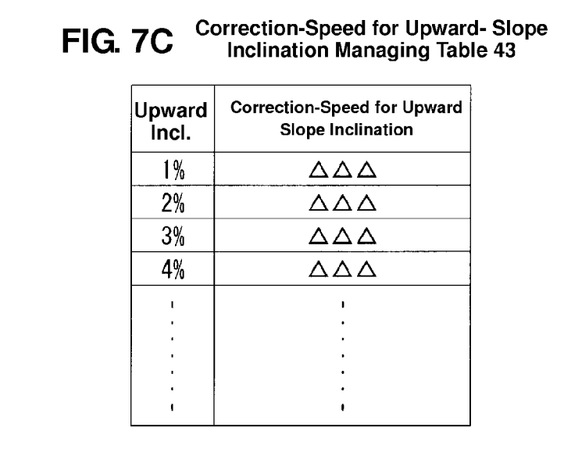
Figure 7D:
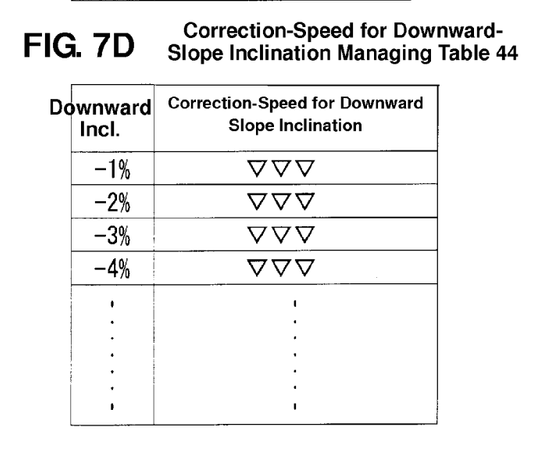

Hereinafter, a preferred embodiment of the present invention will be described. FIG. 1 is a schematic constitution diagram of a vehicle 1 which is equipped with an automatic transmission 10 according to an embodiment of the present invention. FIG. 2 is an explanatory diagram of a shift operational portion 20. FIG. 3 is a block diagram of a control device 30 to control the automatic transmission 10. FIG. 4 is a flowchart of a shift operation of an automatic shift-up control. FIG. 5 is an explanatory diagram regarding an engine speed during the shift operation of the automatic shift-up control. FIG. 6 is a flowchart to set a specified engine speed A. FIGS. 7A, 7B, 7C, 7D are explanatory diagrams regarding managing tables memorized at a memory portion 38 of the automatic transmission 10.

As shown in FIG. 1, a power unit which is comprised of an engine 2 and the automatic transmission 10 is disposed in an engine room 1A at a front portion of the vehicle 1. Further, two seats 3a, 3b for a driver and a passenger are provided in a vehicle compartment 1B. A steering wheel 4 is disposed in front of the driver's seat 3a. A shift operational portion 20 is disposed at a center console 5 between the two seats 3a, 3b.

The shift operational portion 20 comprises a shift lever 21 which has a grip 21a at its top and a guide plate 22 which has an operational guide 23 to guide an operation of the shift lever 21.

As shown in FIG. 2B, the operational guide 23 has a parking range position P on its front side (upward in FIG. 2B), a reverse range position R which is located in back (downward in FIG. 2B) of the parking range position P, a neutral range position N which is located on the right behind the reverse range position R, a forward range position D which is located right behind the neutral range position N, and a manual range position M which is located on the right side of the forward range position D.

Herein, the directions explained in this specification mean the ones when viewed from the driver seated in the seat 3. For example, the vehicle front side means a forward side of the vehicle which is on the side of the engine room 1A, and the right side means a right side for the driver who is seated looking forward.

The manual range position M has a guide with a reverse-T shape relative to the forward range position D. A shift-down switch 24 is installed at a portion on the vehicle front side with an indication "−", which is pressed by the sift lever 21 being sifted forward. Meanwhile, a shift-up switch 25 is installed at a portion on the vehicle rear side with an indication "+", which is pressed by the sift lever 21 being sifted rearward.

According to the above-described structure, the driver can shift the sift lever 21 along the operational guide 23 of the guide plate 22 to the specified position, thereby selecting a specified desired range of the automatic transmission 10 of the vehicle 1. Specifically, the automatic transmission 10 is set to the automatic shift mode by the shift lever 21 being shifted to the forward range position D, and the vehicle can be moved forward with an accelerator being pressed, an illustration of which is just omitted here.

Further, the operation of sift-up or sift-down can be achieved by shifting the shift lever 21 to the manual range position M and then pressing the shift-up switch 25 or the shift-down switch 24 with the shift lever 21 being moved longitudinally.

Hereinafter, the structure of the control device 30 to control the automatic transmission 10 will be described referring to FIG. 3. The control device 30 comprises, as shown in FIG. 3, a controller 31 and various sensors which are operationally coupled to the controller 31 which include a vehicle speed sensor 32 which detects the vehicle speed, an accelerator opening sensor 33 which detects the position of the operated shift-lever 21, a shift position sensor 34 which detects the opening of the accelerator, a turbine speed sensor 35 which detects the turbine speed of the torque converter, an oil temperature sensor 36 which detects the ATF's temperature, an inclination sensor 37 which detects the degree of inclination of the traveling road of the vehicle 1, and a memory portion 38 which memorizes managing tables (see FIGS. 7A-7D), which will be described later, and the like.

The above-described shift-down switch 24 and the shift-up switch 25 of the shift operational portion 20 are operationally coupled to the controller 31 as well. The automatic transmission 10 is also connected to the controller 31 so as to be controlled by shift command signals from the controller 31.

Hereinafter, the automatic shift-up operation to prevent the over revolution of the engine at the manual mode according to the automatic transmission 10 which achieves the shift operation with the shift command from the controller 31 will be described referring to the flowchart of FIG. 4.

First, the controller 31 determines whether the shift lever 21 is located at the manual range position M or not, that is, whether the manual mode is selected or not, based on the detection result of the shift position sensor 34 (step s1).

When the selected mode is not the manual mode, that is, when the sift lever 21 is shifted and located at the forward range position D and thereby the mode is selected to the automatic shift mode (No in the step s1), the shift operation is achieved properly based on the shift map of the automatic shift mode, so that the engine's over revolution state may not be caused. Thus, the control ends.

When the shift lever 21 is shifted and located at the manual range position M and thereby the manual mode is selected (Yes in the step s1), the engine speed is detected from detection result of the turbine speed sensor 35, and it is determined whether the engine speed exceeds the preset limit speed A or not (step s2).

When the detected engine speed does not exceed the preset limit speed A (No in the step s2), the engine's over revolution is not caused. Thus, the control ends.

Meanwhile, when the detected engine speed exceeds the preset limit speed A (Yes in the step s2), the controller 31 detects the opening of the accelerator with the accelerator opening sensor 33 and memorizes this detected accelerator opening at the memory portion 38 as accelerator opening memory AP01 (step s3), and then outputs the shift-up command to the automatic transmission 10 to prevent the engine's over revolution (step s4). Herein, this output of the shift-up command makes the shift-up operation of the automatic transmission 10 start (shift start S).

After outputting the shift-up command to the automatic transmission 10 (shift start S), the controller 31 determines whether or not the accelerator-closing operation with more than a specified opening B occurs by comparing the current detection result of the accelerator opening sensor 33 with the accelerator opening memory AP01 memorized at the memory portion 38 (step s5).

When the accelerator closing's opening is the specified opening B or less (No in the step s5), the automatic shift-up operation continues (step s7), and the control ends.

When the accelerator closing's opening is more than the specified opening B (Yes in the step s5), the shift-up operation of the automatic transmission 10 based on the shift-up command (shift start S) which has been outputted to the automatic transmission 10 in the step s4 continues, and it is determined whether or not the timing of the accelerator-closing operation has passed the inertia-phase start timing I which is shown by the top of the turbine speed of FIG. 5.

Herein, the inertia-phase start timing I is a transitional timing from the torque phase to the inertia phase of gear shifting as shown in FIG. 5, where the reverse change in the direction of the increase or decrease of the engine speed or the turbine speed due to the shift-up operation is detected. The inertia-phase start timing I may be set to timing when a specified period of time has passed from the shift-up command.

When the accelerator-closing operation timing has passed the inertia-phase start timing I (Yes in step s6; see the accelerator-closing operation 2 in FIG. 5), the automatic shift-up operation continues (the step s7), and the control ends.

When the accelerator-closing operation timing has not passed yet the inertia-phase start timing I, that is, it is before the inertia-phase start timing I (No in step s6; see the accelerator-closing operation 1 in FIG. 5), the automatic shift-up operation is cancelled (step s9) and thereby the shift gear returns to the original gear, and the control ends. Herein, the control repeats from "START" to "RETURN" during the vehicle traveling.

Next, the preset-limit speed setting processing for setting the preset limit speed A which is the reference speed to compare the engine speed detected in the step s2 will be described referring to FIGS. 6 and 7.

In the control device 30 which outputs the shift command to the automatic transmission 10, the preset limit speed A is set to be lower than the engine's limit speed L so that the engine speed does not exceed the engine's limit speed L even if the engine speed increases during the operational time T as shown in FIG. 5. Herein, the operational time T is the period of time from the shift-up start (shift start S: the shift-up command from the controller 31 to the automatic transmission 10) to the shift-up completion (shift completion E).

Further, the operational time T is not constant but changes depending on the shift gears selected because the disposition or the mechanism of the frictional elements (clutches, brakes) of the automatic transmission 10 changes depending on the shift gears selected.

Accordingly, in case of the shift gear which requires the longer operational time T, the preset limit speed A may be set to a low speed considering the speed's increase. Meanwhile, in case of the shift gear which requires the shorter operational time T, the preset limit speed A may be set to a high speed because of the less influence of the speed's increase. Herein, respective speeds of the preset limit speed A for the respective shift gears are managed as a limit speed for shift gears by a limit-speed managing table for shift gears 41 (see FIG. 7A) which is memorized at the memory portion 38.

Further, the operational time T changes depending on the ATF's temperature inside the automatic transmission 10. Specifically, the general ATF has the dynamic viscosity of 20.8 mm$^2$/s at the normal temperature and the dynamic viscosity of 4.2 mm$^2$/s at the temperature of 100 degrees. Thus, since the operational time T changes depending on the ATF's dynamic viscosity which influences the shift operation of the automatic transmission 10 greatly in such a manner that the operational time T becomes longer when the ATF's temperature is lower and thereby its dynamic viscosity becomes higher, the preset limit speed A is required to be set to the low speed.

Herein, the respective speeds of the preset limit speed A for the ATF's temperatures are managed as a correction speed for temperatures by a correction-speed managing table for temperatures 42 (see FIG. 7B) which is memorized at the memory portion 38.

Moreover, in case the road on which the vehicle 1 travels has some inclination, the operational time T is different from that in case the vehicle's traveling road is flat. Thus, the preset limit speed A is also required to be set depending on the degree of the road's inclination.

Specifically, the increase of the engine speed relative to the change of the accelerator opening is slow in case the traveling road is an upward slope compared to the case in which the traveling road is flat, so that the preset limit speed A can be set to a higher speed. Herein, the respective speeds of the preset limit speed A for the road's inclination degrees of the upward slope are managed as a correction speed for upward-slope inclination by a correction-speed managing table for upward-slope inclination 43 (see FIG. 7C).

On the contrary, the increase of the engine speed relative to the change of the accelerator opening is quick in case the traveling road is a downward slope compared to the case in which the traveling road is flat, so that the preset limit speed A should be set to a lower speed. Herein, the respective speeds of the preset limit speed A for the road's inclination degrees of the downward slope are managed as a correction speed for downward-slope inclination by a correction-speed managing table for downward-slope inclination 44 (see FIG. 7D).

Accordingly, the controller 31 which is to set the appropriate preset limit speed A depending on the states detects the currently-selected shift gear under the manual mode based on the detection result of the shift-position sensor 34 (step t1) first. Then, it reads out the limit speed for shift gears which corresponds to the detected shift gear from the limit-speed for shift gears managing table 41 and sets the limit speed read out as a temporary limit speed A' (step t2).

Subsequently, the controller 31 detects the ATF's temperature from the oil temperature sensor 36 (step t3), and determines whether the detected temperature is lower than the specified reference temperature C or not (step t4). When it is lower (Yes in the step s4), the controller 31 corrects the above-described temporary limit speed A' with the correction speed for temperatures of the correction-speed for temperatures managing table 42 based on the temperature difference from the reference temperature C for lowering the preset limit speed (step t5).

When the detected temperature in the step t3 is the specified reference temperature C or higher (No in the step s4), or after the step t5 is executed, the controller 31 detects the inclination degree of the traveling road with the inclination sensor 37 which calculates the same based on the acceleration (step t6).

When the road's inclination degree detected by the inclination sensor 37 exceeds the reference inclination degree D of the upward slope (Yes in step t7), the controller 31 corrects the temporary limit speed A' with the correction speed for upward-slope inclination of the correction-speed for upward-slope inclination managing table 43 based on the road's inclination degree of the upward slope for raising the preset limit speed (step t8), and then sets this corrected temporary limit speed A' as the preset limit speed A (step t11). The control ends.

Meanwhile, when the road's inclination degree detected by the inclination sensor 37 exceeds the reference inclination degree D of the downward slope (No in the step t7; Yes in step t9), the controller 31 corrects the temporary limit speed A' with the correction speed for upward-slope inclination of the correction-speed for downward-slope inclination managing table 44 based on the road's inclination degree of the downward slope for lowering the preset limit speed (step t10), and then sets this corrected temporary limit speed A' as the preset limit speed A (step t11). The control ends.

Herein, when the road's inclination degree detected by the inclination sensor 37 exceeds the reference inclination degree D (No in the step t7; No in the step t9) and when the detected temperature in the step t3 is the reference temperature C or higher (No in the step t4), the controller 31 sets the temporary limit speed A' which has been set in the step t2 as the preset limit speed A (step t11), and the control ends.

Further, although the lowering of the present limit speed A is executed in the step t5, when the road's inclination degree detected by the inclination sensor 37 does not exceed the reference inclination degree D (No in the step t7; No in the step t9), the controller 31 sets the temporary limit speed A' which has been corrected in the step t5 as the preset limit speed A (step a1), and the control ends.

As described above, the control device 30 of the automatic transmission 10 according to the present invention is equipped with the manual mode in which the gear shift is executed based on the signal of the manual operation, and automatically executes the shift-up control from the gear selected by the manual shift mode to the higher gear when it is detected that the turbine speed exceeds the preset limit speed A.

Further, in case the closing change of the accelerator opening by the specified angle (see the accelerator closing operation 1 in FIG. 5) is detected (Yes in the step s5) during the period of time from the output timing of the shift-up command (the step s4; shift start S) when it is detected that the turbine speed exceeds the preset limit speed A (Yes in the step s2) to the specified timing when the shift-process degree of the shift-up control reaches the inertia phase start I (Yes in the step s6), this shift-up control can be cancelled (step s8; see the shift-up cancellation 1 in FIG. 5).

Accordingly, while the operational time T may be required from the shift-up command (shift start S) to the shift completion E, in case the accelerator closing operation by the driver occurs (the accelerator closing operation 1 in FIG. 5) occurs by the shift-process degree of the shift-up control reaches the inertia phase start I in the operational time T, the shift-up control can be cancelled (the shift-up control 1 in FIG. 5). Thereby, an improperly large reduction of the drive force due to the accelerator closing operation and the shift-up control, which may be unexpected by the driver, can be prevented, thereby preventing any improper deterioration of the drivability.

Further, since the specified process degree of the shift-up control as the transitional boarder between the cancellation and the continuance of the shift-up control is set to the inertia phase start I, any deterioration of the drivability, such as the driver's improper feelings, which may be caused by the shift shock due to the cancellation of the shift-up control, can be prevented.

Specifically, when it is before the inertia phase start I (the accelerator closing operation 1 in FIG. 5), no speed change due to the shift-up control occurs, so that even if the shift-up control is cancelled (the shift-up cancellation 1 in FIG. 5), no unexpected shift shock occurs. However, if the shift-up control is cancelled after the inertia phase start I where the speed change due to the shift-up control occurs (the shift-up cancellation 2 in FIG. 5), the speed change due to the shift-up cancellation occurs (the speed change 2 in FIG. 5), so that an unexpected shift shock which is caused by the speed change due to the shift-up cancellation occurs.

Accordingly, the improper deterioration of the drivability due to the shift-up cancellation can be prevented by canceling the shift-up control (the shift-up cancellation 1 in FIG. 5) if the timing of the accelerator closing operation (the accelerator closing operation 1 in FIG. 5) is before the inertia phase start I and by continuing the shift-up control if that timing is after the inertia phase start I (the accelerator closing operation 2 in FIG. 5).

Herein, while the turbine speed shown in FIG. 5 is detected by the turbine speed sensor 35 to prevent the over revolution of the engine in the above-described present embodiment, an engine speed sensor may be provided at the control device 30 so as to detect the engine speed directly instead because there exists some relationship between the turbine speed and the engine speed as shown in FIG. 5.

Likewise, a tire speed sensor to detect a tire speed may be provided at the control device 30 and the engine speed may be calculated based on gear ratios of the automatic transmission. The present embodiment uses the turbine speed which may be preferable for a properly accurate detection.

Moreover, the control device 30 comprises the inclination sensor 37 which detects the inclination degree of the traveling road of the vehicle 1, and the above-described preset limit speed A is set depending on the detected inclination degree of the traveling road (the steps t8 and t10). Accordingly, the preset limit speed A for detecting the engine's over revolution can be set properly, so that the engine's over revolution can be prevented more surely and any unnecessary shift-up control can be avoided.

Specifically, the increase of the engine speed relative to the change of the accelerator opening is slow in case the traveling road is the upward slope compared to the case in which the traveling road is flat, so that the preset limit speed A can be set to the higher speed.

On the contrary, in case the traveling road is the downward slope, the increase of the engine speed relative to the change of the accelerator opening is quick compared to the case in which the traveling road is flat, so that the preset limit speed A should be set to the lower speed.

Thus, since the preset limit speed A is increased in case of the upward slope and the preset limit speed A is lowered in case of the downward slope, the appropriate setting of the preset limit speed A depending on the inclination of the road can be provided. Accordingly, the engine speed can be prevented from increasing over the engine's limit speed L even in case the vehicle travels on the downward slope, and the automatic shift-up control can be prevented from occurring unnecessarily even in case the vehicle travels on the upward slope.

While both the increasing and the lowering of the preset limit speed A are conducted as described above in the present embodiment, only either one of the above adjusting of the preset limit speed A may be applied.

Further, while the above-described inclination sensor 37 is comprised of the accelerator sensor to detect the accelerator, a method for detecting the road inclination degree based on the drive force and the vehicle speed, or a detecting method for obtaining the road inclination information from the map data of GPS navigation system.

Moreover, since the control device 30 comprises the oil temperature sensor 36 which detects the ATF's temperature of the automatic transmission 10 and the preset limit speed A is set depending on the ATF's temperature in such a manner that the lower the ATF's temperature is, the lower the preset limit speed A is, the engine's over revolution at the low temperature can be prevented surely.

Specifically, since when the ATF's temperature is low and the viscosity of ATF is so high that the operational time T from the shift-up start (shift start S) to the completion (shift completion E) becomes longer compared to a case in which the ATF's temperature is high, by setting the preset limit speed A depending on the ATF's temperature in such a manner that the lower the ATF's temperature is, the lower the preset limit speed A is, even in case the operational time T becomes longer, the engine's over revolution caused by the engine exceeding the engine limit speed L can be prevented surely.

Further, since the control device 30 sets the preset limit speed A which depends on the shift gears set by the manual mode, the engine's over revolution can be prevented more surely and any unnecessary shift-up control can be avoided.

Specifically, the operational time T changes depending on the shift gears because the disposition and mechanism of the frictional elements (clutches, brakes) of the automatic transmission 10, in case of the shift gear which requires the longer operational time T, the preset limit speed A may be set to a low speed considering the speed's increase. Meanwhile, in case of the shift gear which requires the shorter operational time T, the preset limit speed A may be set to a high speed because of the less influence of the speed's increase. Thereby, the engine's over revolution can be prevented more surely and any unnecessary shift-up control can be avoided.

The correspondence relationships of the constitution of the present invention to the above-described embodiment as follows: the manual shift mode corresponds to the manual mode; the engine speed corresponds to the turbine speed; the specified engine speed corresponds to the preset limit speed A; the specified process degree corresponds to the inertia phase start I; the specified-angle closing change of the accelerator opening corresponds to the accelerator closing operation; the shift control device corresponds to the control device 30; the road-inclination detecting means corresponds to the inclination sensor 37; the oil temperature corresponds to the ATF's temperature; and the automatic-transmission oil-temperature detecting means corresponds to the oil temperature sensor 36.

The present invention should not be limited to the above-described embodiment, and any other modifications and improvements may be applied within the scope of a sprit of the present invention. For example, another processing method may be applied, in which the inertia phase start I is watched by the controller 31 which gets the detection result of the turbine speed sensor 35 after the shift-up command (shift start S) of the step s4, and the shift-up control is cancelled when the accelerator closing operation with the specified closing angle B is detected in case of no detection of the inertia phase start I. Further, the detection of the timing of the inertia phase start I in the step s6 may be conducted by detecting the specified period of time having passed from the output timing of the shift-up command.

What is claimed is:

1. A shift control device of an automatic transmission which is equipped with a manual shift mode, in which a gear shift is executed based on a signal of a manual operation, comprising:
a shift-up control means for executing a shift-up control, in which a gear selected by the manual shift mode is automatically shifted up to a higher-speed gear when an engine speed exceeds a specified engine speed;

an accelerator-opening change detecting means for detecting a closing change of an accelerator opening by a specified angle during a period of time from an output timing of a shift-up command when the engine speed exceeds the specified engine speed to specified timing when a shift-process degree of the shift-up control by said shift-up control means reaches a specified process degree; and a shift-up control canceling means for canceling the shift-up control by said shift-up control means when the specified-angle closing change of the accelerator opening is detected by said accelerator-opening change detecting means.

2. The shift control device of an automatic transmission of claim 1, wherein said specified process degree of the shift-up control is set to specified timing at a start of an inertia phase of gear shifting-up.

3. The shift control device of an automatic transmission of claim 2, wherein said specified timing at the start of the inertia phase is set to timing when a specified period of time has passed from the shift-up command.

4. The shift control device of an automatic transmission of claim 3, further comprising a road-inclination detecting means for detecting an inclination degree of a road ahead of a traveling vehicle, and a setting means for setting said specified engine speed depending on the road inclination degree detected by said road-inclination detecting means.

5. The shift control device of an automatic transmission of claim 4, further comprising an automatic-transmission oil-temperature detecting means for detecting an oil temperature of the automatic transmission, and a setting means for setting said specified engine speed depending on the oil temperature detected by said automatic-transmission oil-temperature detecting means in such a manner that the lower the oil temperature is, the lower the specified engine speed is.

6. The shift control device of an automatic transmission of claim 1, wherein said specified process degree of the shift-up control is set to timing when a specified period of time has passed from the shift-up command.

7. The shift control device of an automatic transmission of claim 6, further comprising a road-inclination detecting means for detecting an inclination degree of a road ahead of a traveling vehicle, and a setting means for setting said specified engine speed depending on the road inclination degree detected by said road-inclination detecting means.

8. The shift control device of an automatic transmission of claim 7, further comprising an automatic-transmission oil-temperature detecting means for detecting an oil temperature of the automatic transmission, and a setting means for setting said specified engine speed depending on the oil temperature detected by said automatic-transmission oil-temperature detecting means in such a manner that the lower the oil temperature is, the lower the specified engine speed is.

9. A shift control device of an automatic transmission which is equipped with a manual shift mode, in which a gear shift is executed based on a signal of a manual operation, comprising:

a shift-up control means for executing a shift-up control, in which a gear selected by the manual shift mode is automatically shifted up to a higher-speed gear when an engine speed exceeds a specified engine speed;

an accelerator-opening change detecting means for detecting a closing change of an accelerator opening by a specified angle during a period of time from an output timing of a shift-up command when the engine speed exceeds the specified engine speed to specified timing when a specified period of time has passed from the shift-up command; and a shift-up control canceling means for canceling the shift-up control by said shift-up control means when the specified-angle closing change of the accelerator opening is detected by said accelerator-opening change detecting means.

10. The shift control device of an automatic transmission of claim 9, further comprising a road-inclination detecting means for detecting an inclination degree of a road ahead of a traveling vehicle, and a setting means for setting said specified engine speed depending on the road inclination degree detected by said road-inclination detecting means.

11. The shift control device of an automatic transmission of claim 10, further comprising an automatic-transmission oil-temperature detecting means for detecting an oil temperature of the automatic transmission, and a setting means for setting said specified engine speed depending on the oil temperature detected by said automatic-transmission oil-temperature detecting means in such a manner that the lower the oil temperature is, the lower the specified engine speed is.

12. A shift control device of an automatic transmission which is equipped with a manual shift mode, in which a gear shift is executed based on a signal of a manual operation, wherein a shift-up control is executed such that a gear selected by said manual shift mode is automatically shifted up to a higher-speed gear when it is detected that an engine speed exceeds a specified engine speed, and said shift-up control is cancelled when a closing change of an accelerator opening by a specified angle is detected during a period of time from an output timing of a shift-up command when it is detected that the engine speed exceeds the specified engine speed to specified timing when a shift-process degree of said shift-up control reaches a specified process degree.

* * * * *